United States Patent [19]
Klein et al.

[11] 4,415,709
[45] * Nov. 15, 1983

[54] PROCESS FOR FORMING POWDERS FROM ION CONTAINING POLYMERS

[75] Inventors: Robert R. Klein, Berkeley Heights, N.J.; Henry S. Makowski, deceased, late of Scotch Plains, N.J., by Patricia H. Makowski, executrix

[73] Assignee: Exxon Research and Engineering Co., Florham Park, N.J.

[*] Notice: The portion of the term of this patent subsequent to Mar. 23, 1999 has been disclaimed.

[21] Appl. No.: 308,583

[22] Filed: Oct. 5, 1981

Related U.S. Application Data

[63] Continuation-in-part of Ser. No. 136,374, Apr. 1, 1980, abandoned.

[51] Int. Cl.³ .............................. C08F 8/36; C08F 8/44
[52] U.S. Cl. .................................... 525/344; 525/232; 525/331.8; 528/500; 528/502
[58] Field of Search ............... 525/344, 189, 212, 232; 528/500, 502

[56] References Cited
U.S. PATENT DOCUMENTS

| | | | |
|---|---|---|---|
| 3,284,393 | 11/1966 | Vanderhoff | 526/303 |
| 3,468,833 | 9/1969 | Meincke | 526/911 X |
| 3,642,728 | 2/1972 | Canter | 525/344 |
| 3,801,531 | 4/1974 | Berejka | 525/344 |
| 4,131,586 | 12/1978 | Makowski | 260/DIG. 31 |
| 4,187,206 | 2/1980 | Brenner | 260/DIG. 31 |
| 4,321,340 | 3/1982 | Klein | 525/344 |

*Primary Examiner*—C. A. Henderson
*Attorney, Agent, or Firm*—Richard E. Nanfeldt

[57] ABSTRACT

The present invention relates to a process for the forming of a powder composition of a sulfonated polymer, wherein the powder has a volume density of about 15 to about 30 pounds/cubic foot and a water content of less than 2 wt. % wherein the polymer is selected from neutralized sulfonated elastomeric and thermoplastic polymers.

11 Claims, 1 Drawing Figure

PROCESS FOR FORMING POWDERS FROM ION CONTAINING POLYMERS

CROSS-REFERENCE TO RELATED APPLICATION

This application is a Continuation-in-Part of Ser. No. 136,374, filed Apr. 1, 1980, now abandoned.

BACKGROUND OF THE INVENTION AND PRIOR ART

1. Field of the Invention

The present invention relates to an improved process for the forming of an improved powder composition of a polymer, wherein the powder has a particle size distribution of from about 500 to about 3,000 microns, a water content of less than 2 wt. %, and a sulfonate content of less than 250 meq./100 g polymer, the polymer is selected from the group including sulfonic acid derivatives of elastomeric and thermoplastic polymers, neutralized sulfonated elastomeric or thermoplastic polymers, and EPDM elastomers.

2. Description of the Prior Art

Recently, a new class of thermoplastic sulfonated polymers has been described in a number of U.S. patents. These sulfonated polymers are derived from polymeric materials having olefinic unsaturation, especially elastomeric polymers, such as Butyl and EPDM rubbers. U.S. Pat. No. 3,642,728, herein incorporated by reference, clearly teaches a method of selective sulfonation of olefinic unsaturation sites of an elastomeric polymer to form a sulfonated elastomeric polymer. The olefinic sites of the elastomeric polymer are sulfonated by means of a complex of a sulfur trixoide donor and a Lewis base. The sulfonate groups of the sulfonated elastomer can be readily neutralized with a basic material to form an ionically cross-linked elastomer having substantially improved physical properties over an unsulfonated elastomer at room temperature. However, these ionically cross-linked elastomers may be processed like conventional thermoplastics at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups IA, IB, IIA, IIB and aluminum, iron, cobalt and lead and mixtures thereof of the Periodic Table of Elements. Although these sulfonated elastomeric polymers prepared by the process of this patent are readily useable in a certain number of limited applications, they are not as readily adaptable for blending with fillers and oil extenders and polyolefinic resins due to their inability to be formed as a powder but rather being produced as large particle size pellets ($\geq \frac{1}{8}''$).

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the sulfonated elastomeric polymers are organic amines. Again, these compositions were not produced as powders.

U.S. Pat. No. 3,870,841, herein incorporated by reference, teaches a method of plasticization of the polymeric backbone of a neutralized sulfonated plaster polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are again not powders.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of this invention are not powders.

Products resulting from the aforementioned methods for obtaining neutralized sulfonated elastomeric compositions are not capable of being readily blended with extenders to produce homogeneous dry blends.

SUMMARY OF THE INVENTION

It has been found surprisingly that powdered compositions of sulfonated elastomeric and thermoplastic polymers can be readily manufactured by an improved process wherein the powder has a particle size distribution of about 500 to about 3,000 microns and a volume density of about 10 lb/ft$^3$ to about 25 lb/ft$^3$.

It is well known in the fabrication of polymers that the dispersion of extenders into a polymer matrix during compounding is directly related to the size of the polymer particle. As the particle size of the polymer decreases, the surface area of the polymer increases, thereby permitting the polymeric matrix to more readily wet the surface of fillers thereby improving the dispersion of the filler into the matrix. Although many thermoplastic resins can be cryogenically ground into fine powders, powders of sulfonated and unsulfonated elastomeric polymers due to their low Tg are not readily obtainable by this cryogenic process. Such cryogenically ground polymers are non-porous and, at equivalent particle diameters, are of lower surface area than the powders produced in this improved process.

The process of the instant invention can generally be described as a process for forming a powder of a metal, ammonium or amine neutralized sulfonated polymer wherein said neutralized sulfonated polymer is derived from an EPDM terpolymer, a Butyl rubber or polystyrene which comprises the steps of:

(a) contacting a quenched cement of a polymer dissolved in a hydrocarbon solvent with a sulfonating agent to form an unneutralized sulfonated polymer;

(b) adding an amine or neutralizing agent which is a basic salt to said quenched cement, wherein a counterion of said basic salt is selected from the group consisting of ammonium, antimony, iron, lead and Groups IA, IIA, IB and IIB of the Periodic Table of Elements;

(c) adding water to said quenched cement at a volume ratio of water to quenched cement of 60:1 to 2:1;

(d) emulsify such mixture of water and cement particles to form a slurry of such neutralized sulfonated polymer in said water, said cement particles having a viscosity of about 100,000 to about 100,000 and said slurry having a viscosity of about 0.9 to about 1.1;

(e) removing said hydrocarbon solvent from said slurry;

(f) separating said particles of said powder from said water; and (g) drying said particles of said powder.

GENERAL DESCRIPTION

Figure 1:
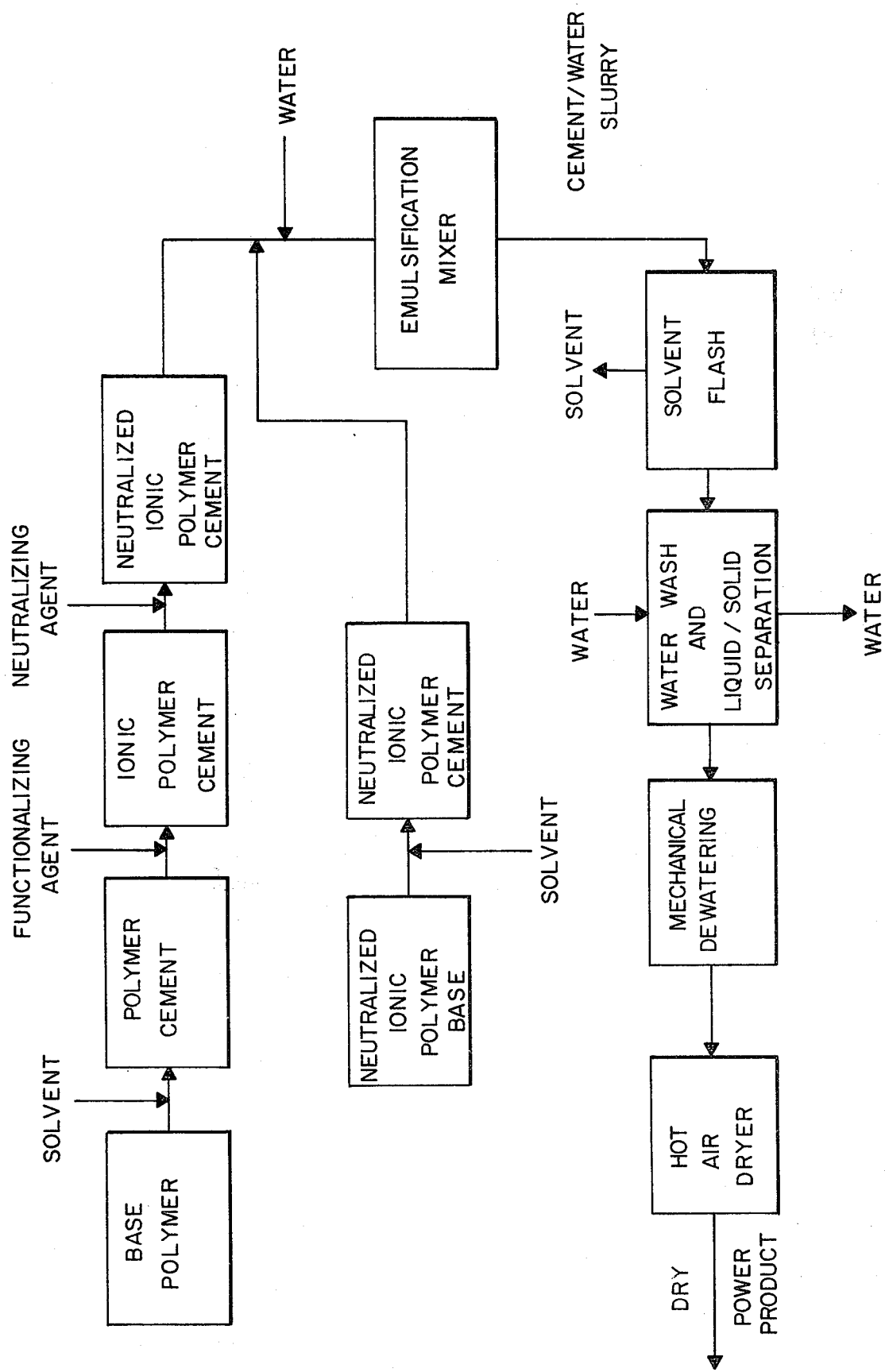
FIG. 1 illustrates a schematic drawing of the described processes of the instant invention.

The present invention relates to improved processes for the formation of neutralized sulfonated elastomeric and thermoplastic polymers.

The neutralized sulfonated elastomeric polymers of this present instant invention are derived from unsaturated polymers which include low unsaturated elastomeric polymers such as Butyl rubber, or EPDM terpolymers. Alternatively, other unsaturated polymers are selected from the group consisting of partially hydrogenated polyisoprenes, partially hydrogenated polybutadienes, Neoprene, styrene-butadiene copolymers or isoprene-styrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. Butyl rubber generally has a Staudinger molecular weight of about 20,000 to about 5,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

A typical Butyl Rubber which is useful is Exxon Butyl 365 (Exxon Chemical Co.), having a mole percent unsaturation of about 2.0 and a Mooney viscosity (ML, 1+8, 212° F.) of about 40–50. Low molecular weight Butyl rubbers, i.e., Butyl rubbers having a viscosity average molecular weight of about 5,000 to 85,000 and a mole percent unsaturation of from about 1 to about 5 may be sulfonated to produce the polymers useful in this invention. Preferably, these polymers have a viscosity average molecular weight of about 25,000 to about 60,000.

The EPDM terpolymers of the instant invention are low unsaturated polymers having about 1 to about 10.0 wt. % olefinic unsaturation, more preferably about 2 to about 8, more preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incoporated herein by reference. The preferred polymers contain about 40 to about 80 wt. %. ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g. 5.0 wt. %. The diene monomer is preferably a non-conjugated diene. Illustrative of these non-conjugated diene monomers which may be used in the terpolymer (EPDM) are 1,4-hexadine, dicyclopentadiene, 5-ethylidene-2-norbornene, 5-methylene-2-norbornene, 5-propenyl-2-norbornene, and methyl tetrahydroindene. Some examples of useful EPDM terpolymers are Vistalon 2504 and 2504-20 (Exxon) and Nordel 1320 (du Pont).

The EPDM terpolymers of this invention have a number average molecular weight ($\overline{M}n$) as measured by GPC of about 10,000 to about 200,000, more preferably of about 15,000 to about 100,000, and most preferably of about 20,000 to about 60,000. The Mooney viscosity (ML, 1+8, 212° F.) of the EPDM terpolymer is about 5 to about 60, more preferably about 10 to about 50, most preferably about 15 to about 40.

The thermoplastic resins of the instant invention are polystyrene thermoplastic resins which are selected from the group consisting of polystyrene, polyvinyltoluene, poly-t-butyl-styrene, polychlorostyrene, poly-alpha-methyl styrene or co- or terpolymers of the aforementioned monomers with themselves or with acrylonitrile. The polystyrene resins suitable for use in the practice of this invention have a weight average molecular weight of about 5,000 to about 500,000, more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexus modulus $>$ 10,000 psi) material capable of retaining the ability to flow at elevated temperatures for relatively long times.

The preferred polystyrene thermoplastic resin is a homopolymer of styrene having a number average molecular weight of about 180,000, and an intrinsic viscosity in toluene of about 0.8. These polymers are widely available commercially in large volume. A suitable polystyrene resin is Styron 666 (Dow Chemical) which affords a suitable molecular weight.

This invention involves the preparation or powders of ionic-containing polymers. The ion-containing polymer, preferably a sulfonate containing polymer, is dissolved in an organic solvent, which is largely immiscible with water, or in a mixture of such organic solvent and a polar cosolvent, such as an alcohol or an amine, which is largely miscible with water. The major solvent in the binary solvent mixture is preferably the water immiscible organic solvent. The minor component polar cosolvent functions to dissociate the ionic associations and thereby promote solution of the ion-containing polymer. Most systems employ the binary solvent. Single solvent systems require low ionic group content and are limited to the least ionic cations.

The quenched cements of the ion-containing polymers can be prepared from preformed and isolated polymers through re-solution or by in-situ sulfonation of the polymer in a hydrocarbon solvent and its subsequent quenching with water or methanol at a volume ratio of water or methanol to cement of about 1:1. Preferably the quenched cements are those which exist at the end of the manufacturing process, prior to dry polymer isolation.

When quenched cements of ion-containing polymers are contacted with water a marked increase in cement viscosity or the formation of a gel occurs. When the cement is composed of a single organic solvent, viscosity increases or gelation occurs through the interaction of water with the ionic groups thereby resulting in an increased degree of association of the ion-containing polymer chains. When the cement is composed of a binary solvent the water also serves to remove the solubilizing polar cosolvent. Thus, in the process of this invention the water is not simply serving as a dispersion medium but exercises a vitally important function in the formation of powders.

When the cements of ion-containing polymers are contacted with water under high shear very small particles of cement dispersed in water are formed. The polar cosolvent, if present, is rapidly extracted into the water phase, and water rapidly diffuses into the organic phase to effect marked viscosity increases in the cement particle or a gelation of the particle. When essentially gelled the particle can be considered a crosslinked polymer swollen by solvent. If the crosslinking is high then the cement viscosity is very high and gel strength very high. Under these conditions the swollen particle is extremely stable and will not agglomerate with other such particles. Particle stability is not the result of emulsifiers of other such stabilizing compounds but is due simply to the high viscosity or high gel strength of the cement. The gelled particles of the cement have a viscosity of about 50,000 to about 100,000, wherein said gelled particles are suspended to the water such that the overall viscosity of the water and gelled particles is about 0.9 to about 1.1, thus enabling one to readily pump the formed slurry of gelled particles of cement in water.

Once such dispersions are prepared they are very stable and can be stored for long periods without substantial agglomeration. In addition, because of the high gel strength of the swollen particle not only is agglomeration of the particles substantially prevented but also adhesion of the particles to surfaces is prevented. Thus, one significant advantage of this process is that little if any fouling occurs either during the preparation of the dispersion or during the solvent stripping operation with hot water.

The stripping of the solvent from the swollen particle is promoted by the small size of the particle. Solvent stripping is not only very rapid but also very efficient. In addition, when the solvent is stripped the particle remains very porous since the gel network remains during and after solvent removal and the solvent is thereby replaced by empty space.

The wet powders are more readily dried because of their high surface areas in equipment such as tunnel dryers, fluid bed dryers, tray dryers, vacuum dryers, and the like. This overall process permits the isolation and drying of ion-containing polymers which are unable to be melt processed, i.e. which possess melt viscosities so high that they cannot be extruded. Since many ion-containing polymers are useful in solution applications the process of this invention permits the isolation of clean, dry polymers which cannot be produced any other way.

The powders prepared according to the process of this invention possess many advantages over polymers which are much larger in size and which are not porous. In thermoplastic applications the polymer is formulated with a wide variety of fillers, extenders, and other additives in order to reduce material cost while improving the properties of the composition. Normally this sort of mixing is conducted with high shear energy intensive mixers. While this is indeed possible with the powders of this invention it is preferred that the powders be dry-mixed with the various ingredients to obtain a well-dispersed, homogeneous blend which requires little additional mixing on fluxing. The dry mixes can be charged directly to injection molders where the fluxing and little additional mixing provides for a uniform and well dispersed article. These dry mixes also permit the formulation of ion-containing polymers which possess such high melt viscosities that the mixing of such polymers with large particle sizes results in poor dispersion, poor rheological properties, and poor properties of the final article.

The small size and porous nature of the powders produced according to the instant process also allows for very rapid solution of the ion-containing polymers either in single solvent or binary solvent systems. Rapid solution is not only very desirable but absolutely necessary in some applications for economical operation in respect to both time and energy saving.

The elastomeric or thermoplastic polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane. isohexane, or heptane. The cement of the elastomeric or thermoplastic polymer is contacted with a sulfonating agent in a reaction zone at a temperature of about $-10°$ C. to about $100°$ C. for a period of time of about 1 minute to about 120 minutes, most preferably for about 5 to about 90 minutes; and most preferably about 15 to about 60. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in chlorinated aliphatic or aromatic hydrocarbon.

It should be pointed out that neither the sulfonating agent nor the manner of sulfonation is critical in producing the unneutralized sulfonate derivative provided that the sulfonating method does not degrade the polymer backbone. The unneutralized sulfonated polymer has about 5 to about 250 meq. sulfonate groups per 100 grams of sulfonated polymer, more preferably about 7 to about 200, and most preferably about 10 to about 175. The meq. of sulfonate groups/100 grams of polymer is determined by both titration of the polymeric sulfonate and Dietert Sulfur Analysis. In the titration of the sulfonated polymer, the polymer is dissolved in suitable solvent at a concentration level of 50 grams per liter of solvent. The dissolved sulfonated polymer is titrated with ethanolic sodium hydroxide to an Alizarin-Thymolphthalein endpoint.

The unneutralized sulfonated polymer is gel free and hydrolytically stable. Gel is measured by stirring a given weight of polymer in a solvent at a concentration of 5 wt. % for 24 hours, allowing the mixture to settle, withdrawing a weighed sample of the supernatant solution and evaporating to dryness. Hydrolytically stable means that the acid function, in this case the unneutralized sulfonated polymer, will not be eliminated under neutral or slightly basic conditions to a natural moiety which is incapable of being converted to highly ionic functionality.

Neutralization of the unneutralized sulfonated polymer is done by the addition of a solution of a basic salt or an amine to the unneutralized sulfonated elastomeric polymer dissolved in a suitable solvent or mixture of solvents. The amine can be a primary, secondary, or tertiary amine as well as a tetralkyl ammonium hydroxide wherein the substituents contain from 1 to 50 carbon atoms. The basic salt is dissolved in a binary solvent system consisting of water and/or an aliphatic alcohol.

The monovalent counterions (cations) of these basic salts are selected from the group consisting of ammonium, lithium, sodium, potassium and cesium and mixtures thereof. The anion of the basic salt is selected from a carboxylic acid having from about 1 to about 4 carbon atoms a hydroxide or alkoxide having about 1 to about 4 carbon atoms and mixtures thereof. The preferred neutralizing agent is a metal hydroxide, more preferably sodium hydroxide. Sufficient base is added to the solution of the unneutralized sulfonated elastomeric polymer to effect neutralization. It is preferable to neutralize at least 95% of the sulfonate groups, more preferably about 98%, most preferably 100%.

The di- or trivalent or multivalent counterions (cations) of the basic salts are selected from the group consisting of antimony, aluminum, lead or Groups II-A, I-B II-B of the Periodic Table of Elements and mixtures thereof. The anion of the basic salt is selected from a carboxylic acid having from about 1 to about 4 carbon atoms, a hydroxide or alkoxide having about 1 to about 4 carbon atoms and mixtures thereof. The preferred neutralizing agent is a metal acetate.

The metal or ammonium sulfonate-containing polymers at the higher sulfonate levels possess extremely high melt viscosities and are thereby difficult to melt process. The addition of ionic group plasticizers markedly reduces melt viscosity and frequently enhances physical properties.

To the solution of the neutralized sulfonated polymer can be added a preferential plasticizer selected from the group consisting of carboxylic acid having about 5 to about 30 carbon atoms, more preferably about 8 to about 22 carbon atoms, and the zinc and lead salts of these carboxylic acids. The carboxylic acids are selected from the group consisting of lauric, myristic, palmitic, or stearic acids and mixtures thereof; e.g, zinc stearate, lead stearate, or zinc laurate.

The preferential plasticizer is incorporated into the neutralized sulfonated elastomeric polymer at less than about 60 parts by weight per 100 parts by weight of the neutralized sulfonated polymer, more preferably at about 8 to about 40, and most preferably at about 10 to about 25. The metallic salt of the carboxylic acid can also be used as neutralizing agent. In the case of the neutralizing agent and plasticizer being the identical chemical species, additional metallic salt is added over the required levels of neutralization. Alternatively, other preferantial plasticizers are selected from amines, carbonates, amides, such as stear-amide, and ammonium and amine salts of carboxylic acids and mixtures thereof. The preferred plasticizers are selected from carboxylic acids having about 5 to about 30 carbon atoms or metallic salts of the carboxylic acid and mixtures thereof.

To the neutralized sulfonated polymer in the cement can be added a non-polar backbone process oil. The oils employed in the present invention are non-polar process oils having less than about 2 wt. % polar-type compounds as measured by molecular-type clay gel analysis. These oils are selected from paraffinics ASTM Type 104B as defined in ASTM-D-2226-70, aromatics ASTM Type 102 or napthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table I illustrates typical oils encompassed by the scope of this invention. The oils are incorporated into the blend composition at a concentration level of about 20 to about 200 parts by weight per 100 parts by weight of the neutralized sulfonated polymer, more preferably at about 20 to about 175, and most preferably at about 25 to about 150.

TABLE I

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | | 1.3 | 70.3 | 28.4 |
| Naphthenic | Flexon 765 | 505 | | 0.9 | 20.8 | 78.3 |

The process of the instant invention generally includes dissolving a polymer in the non-reactive solvent, as previously defined, to form a cement wherein the concentration of the polymer in the cement is about 1.0 to about 40.0 g/100 ml of cement, more preferably about 5.0 to about 30.0 and most preferably about 10.0 to about 25.0. Alternatively, the polymer can be sulfonated with the previously described sulfonating agents in a hydrocarbon solvent and subsequently quenched by the addition of water or methanol at a concentration level of less than 1 volume part of water to one volume part of cement. By quenched cement of a polymer dissolved in a hydrocarbon solvent is meant either the redissolving of a crumb of a sulfonated polymer in a hydrocarbon solvent or the in situ formation of the sulfonated polymer by sulfonation of the polymer in a hydrocarbon solvent and its subsequent quenching. The cement of the unsulfonated polymer is contacted with a sulfonating agent, as previously defined and sulfonation of the polymer is effected according to the previously defined procedures, thereby forming a quenched cement of an unneutralized sulfonated polymer. To the quenched cement of the unneutralized sulfonated polymer derivative is added an amine or a basic salt of a monovalent or multivalent cation as previously defined, thereby forming a quenched cement of metal or ammonium neutralized sulfonated polymer. To the quenched cement of the metal or ammonium neutralized sulfonated polymer can be added the preferential plasticizer or non-polar process oil. To the cement of the metal or ammonium neutralized sulfonated EPDM terpolymer is added water at volume ratio of water to cement of 60:1 to 2:1, more preferably 20:1 to 2:1 and most preferably 4:1 to 2:1. The blend of water and cement is then subject to high shear emulsification to form a slurry of cement particles which are either gelled or extremely high in viscosity containing the ionic polymer in water. The slurry of cement particles in the water has a viscosity of about 50,000 to about 100,000. When the volume ratio of water to the quenched cement is less than 2:1 as shown in the examples, the resultant material has a viscosity in excess of 50,000 and is non-pumpable. For example, at a volume ratio of water to quenched cement of about 1/1 the viscosity is about 500,000 because at these low volume concentrations of water the entire system becomes gelled and a slurry of quenched cement particles in water is not formed as in the instant invention. The viscosity of the cement particles in the slurry of the instant invention are about 50,000 to about 100,000, more preferably about 50,000 to about 90,000, and most preferably about 50,000 to about 80,000.

The ability of cements to function in this invention is dependent upon the viscosity of the cement particle after contacting with water. The cement particle may contain not only the ion-containing polymer but also fillers, extender oils, and other additives. Thus it is difficult to define the basic parameters of the ion-containing polymer with regard to the ultimate gel strength of the water-contacted particle. However, ion-containing polymers which are useful in the practice of this invention are those which possess a melt viscosity at 200° C. and at a shear rate of 0.88 sec$^{-1}$ of at least about $10^4$ poise, preferably at least about $5 \times 10^4$ poise, and most preferably at least about $10^5$ poise.

Emulsification of the cement can be done batchwise using equipment such as a Waring Blender, Gifford Wood laboratory mixer or a Barinco mixer. It can also be done continuously using commercially available emulsification equipment such as a Greerco hi-shear pipeline mixer, a Akmar emulsion mill or a colloid mill. The continuous process for the formation of the cement slurry in water using equipment such as a 2" Greerco hi-shear pipeline mixer is conducted with rotor speeds of about 5000 RPM's to about 10000 RPM's, more preferably about 7500 to about 10000 and most preferably about 8000 to about 10000. Further fine particle sizes with narrow size distribution can be obtained by using the Greerco tandem shear head configuration and by increasing the residence time of the slurry under the high shear conditions. This can be done by recycling the slurry through the mixer at recycle rate of about 1 to 1 to about 10 to 1 which is substantially the same as reducing the slurry flow rate through the mixer by the same ratios. Fine uniform particles can also be obtained by processing the slurry through a series of mixers in line, that is, process the slurry through from about 2 to about 4 mixers in series. The mixers in this series configuration can also be operated with recycle in the range given above. The slurry is subjected to a solvent flashing operation such as in a batch steam stripper, thereby effecting removal of the solvent. The slurry particles of a fine powder of metal or ammonium neutralized sulfonated polymer can be further washed with water and subsequently filtered. The filtered particles of the fine powder of the metal or ammonium neutralized sulfonated polymer are mechanically dewatered in a device such as a two roll mill, a sludge press or a dewatering extruder to a water content of less than about 20 wt. % water, more preferably less than about 15 wt. % and most preferably less than about 10 wt. %. The particles are then hot air dried in a fluid bed dryer or flash dryers or tunnel dryers to a water content of less than about 2 wt. % of water, more preferable less than about 1 wt. %, and most preferably less than about 0.5 wt. %. The formed and dried powdered particles have a volume density of about 15 to about 30 lbs/cu. foot, more preferably about 18 to about 25, and most preferably about 20 to about 25.

The particle size distribution of the formed powder can be measured by sieve analysis wherein the weight % retained on U.S. Sieve Number Screens is:

TABLE II

| U.S. Sieve Screen Number | Retained Powder wt. % |
|---|---|
| 10–20 | about 60 to about 95 |
| 20–40 | about 3 to about 36 |
| 40–60 | about 0.5 to about 3.0 |

The formed powder can be readily dry blended with various chemical additives such as the previously-mentioned preferential plasticizers or non-polar process oils or with fillers, polyolefinic thermoplastics or waxes and mixtures thereof. The blend composition of the powder and additive can be compounded on a two-roll mill or fed directly into an extruder in order to be extruded or injection molded directly into a finished article. Other methods known in the art which are suitable for making these compositions include those methods employed in the plastic and elastomer industries for mixing polymer systems. An excellent polymer blend composition of this invention can be obtained through the use of a high-shear batch intensive mixer called the Banbury. Alternatively, economic advantages in terms of time and labor savings can be obtained through the use of a Farrel Continuous Mixer, a twin screw extruder, or extrusion techniques which are continuous mixing type equipment. The Banbury mixing device is the preferred batch-type mixer, and the twin screw extruder is the preferred continuous mixer.

The fillers employed in the present invention are selected from the group consisting of carbon blacks, talcs, ground calcium carbonate, water precipitated calcium carbonate, and delaminated, calcined and hydrated clays and mixtures thereof. These fillers are incorporated into the blend composition at about 25 to about 350 parts by weight per 100 parts by weight of the neutralized sulfonated polymer, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85, and most preferably about 10 to about 75. Typical fillers employed in this invention are illustrated in table III.

TABLE III

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |

TABLE III-continued

| Filler | Code # | Oil Absorption grams of oil/100 grams of filler | Specific Gravity | Avg. Particle Size Micron | pH |
|---|---|---|---|---|---|
| Calcined clay | Icecap K | 50–55 | 2.63 | 1 | 5.0–6.0 |
| Magnesium silicate (talc) | Mistron Vapor | 60–70 | 2.75 | 2 | 9.0–7.5 |

Waxes used in the instant invention are derived from various sources: petroleum waxes covering paraffin and micro-crystalline wax; synthetic waxes including polyethylene and Fischer-Tropsch wax; natural waxes from plants, insects and animals. The petroleum and synthetic waxes are most important for the present invention.

Other than paraffinic, naphthenic and aromatic hydrocarbon groups waxes can contain polar functional groups such as alcohols, ketones, and esters. It is preferred that the waxes used in this invention be predominantly non-polar since polar functional groups function as plasticizers for the ionic sulfonate groups. Excessive plasticization is undesirable. The largest percentage of polar functional groups in waxes are those containing oxygen by virtue of hydrocarbon oxidation. For the purpose of this invention, a wax is considered to be non-polar when it contains less than 4.0 wt. %, more preferably less than 2.0 wt. % oxygen.

The waxes are incorporated into the blend composition at a concentration level of about 2 to about 20 parts by weight per 100 parts by weight of the neutralized sulfonated polymer, more preferably about 2 to 15, and most preferably about 7 to about 15.

The waxes employed in the present invention have a softening point of about 125° F. to about 220° F., more preferably about 135° F. to about 200° F., and most preferably about 150° F. to about 200° F. The preferred waxes have an $\overline{M}n$ of about 300 to about 4000. These waxes are typically crystalline wherein the percent crystallinity can vary depending on the composition of the wax and the $\overline{M}n$.

A crystalline polyolefinic thermoplastic can be incorporated into the powder blend composition in minor proportions as a means for modification of the rheological properties of the blend compositions as well as the physical properties of the polymeric article. Typically, the crystalline polyolefinic thermoplastic is added to the blend composition at a concentration level of less than about 100 parts by weight based on 100 parts by weight of the neutralized sulfonated polymer, more preferably at less than about 75; and most preferably at about 5 to about 50.

The crystalline polyolefin is characterized as a polymer of an alpha-olefin having a molecular weight of at least 2000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, etc. The preferred polyolefins are selected from the group consisting of polymers of $C_2$ to $C_4$ alpha-olefins. Most preferably, the polyolefins are selected from the group consisting of polyethylene, polybutene, polypropylene, and ethylene-propylene copolymers. It is critical that the crystalline polyolefin have a degree of crystallinity of at least 40%.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

Example 1

To a clean glass-lined 50 gal. Pfaudler reactor was charged 23.9 gal. of n-hexane. Twenty pounds of cubed Vistalon 2504, a commercial EPDM containing about 50 wt. % ethylene and about 5 wt. % 5-ethylidene-2-norbornene and having a Mooney viscosity of about 40 (ML, 1+8, 212° F.), was then charged to the reactor with agitation. The reactor was heated to and held at about 70° C. The solvent was refluxed through a vertical condenser equipped with a Dean-Stark type trap to collect water that might be present. After solution had occurred the reactor was then cooled to 25° C. To the cement was added 1.59 pounds of acetic anhydride. Then 0.69 pounds of concentrated sulfuric acid was slowly added to the cement with good agitation. The reaction was allowed to proceed for 30 min., then the sulfonated polymer was neutralized with a solution of 1.32 pounds of $Zn(OOCCH_3)_2 \cdot 2H_2O$ in 2.72 gallons of methanol and 0.14 gallons of water. Irganox 1010 (0.028 pounds) was charged to the neutralized cement and the mixture was agitated for 2 hours.

The neutralized cement was then pumped from the reactor and mixed with hot water (88–95° C.) in a nozzle assembly preceding a pipe line "hi-shear" mixer. On passing through the pipe line "hi-shear" mixer, the cement was dispersed as small, discrete particles into the water forming a slurry. This slurry was then fed directly into a batch steam stripper where the hexane removal was effected. The resulting wet polymer was in the form of a fine powder. The cement flow rate was about 0.5 GPM and the water flow rate was about 2.5 GPM. The wet powder was then removed from the stripper and dried in a Fitzpatrick FA-75 fluid bed dryer at an operating air temperature of 200° F. Drying to a final moisture content of less than 1 wt. % $H_2O$ was effected in about $1\frac{1}{2}$ hours from an initial moisture content of 65 wt. %. Titration of a sample of unneutralized sulfonated polymer taken prior to neutralization in toluene/methnaol solution with ethanolic sodium hydroxide showed it to contain about 31 meq. of sulfonate/100 g. polymer. The sulfur and metal contents are given in Table IV along with the particle size distribution of the finished, dried powder.

The stress-strain properties of the neutralized gum were determined at both room temperature and 70° C. on microdumbbells with an Instron TM instrument at 2 inches/minute. Melt viscosity was determined over a range of shear rates at 200° C. with an Instron table model capillary rheometer. The stress-strain and rheological properties of the gum are given in Table V.

The finished powder remained as a free flowing powder when stored under a load of about 2 psi for one month.

This example illustrates the formation of a powder from zinc sulfonate EPDM and the stability of metal sulfonate-containing EPDM powders.

the process described in Example 1. Three different EPDM backbones varying in ethylene content were evaluated and are described below.

| Example | Mooney Viscosity (ML, 1 + 8, 212° F.) | Ethylene Content, Wt. % | ENB Content Wt. % |
| --- | --- | --- | --- |
| 3A | 20 | 55 | 5 |
| 3B | 45 | 49 | 4.9 |
| 3C | 20 | 75 | 5 |

The EPDM was dissolved in hexane to form a 13.2 weight percent solids cement. To the cement was added 77.9 millimoles of acetic anhydride per 100 g EPDM and 33.3 millimoles of sulfuric acid per 100 g EPDM.

TABLE IV

| Example | 1 | 2 | 3A | 3B | 3C | 4A | 4B | 6 |
| --- | --- | --- | --- | --- | --- | --- | --- | --- |
| Elemental Analyses | | | | | | | | |
| Sulfur, Wt. %[a] | 1.02 | 0.98 | 0.98 | 1.00 | 1.00 | 1.02 | 1.02 | 0.75 |
| Sulfonate, meq./100 g Polymer | 32.6 | 31.4 | 31.4 | 32.6 | 32.6 | 32.7 | 32.7 | 24.0 |
| Metal Ion | Zn | Zn | Zn | Zn | Zn | Mg | Na | NH$_4$ |
| Wt. % Metal | 1.74 | 1.78 | 1.78 | 1.74 | 1.61 | 0.56 | 1.17 | 0.34 |
| Meq. metal/100 g Polymer | 55.6 | 56.8 | 56.8 | 55.6 | 51.4 | 47.5 | 52.8 | 24.9 |
| Dried Powder Particle Size | | | | | | | | |
| Retained Powder, Wt. % | | | | | | | | |
| US Sieve Number 10-20 | 93.5 | 95.6 | 95.6 | — | 93.5 | 61.2 | 82.5 | 86.1 |
| US Sieve Number 20-40 | 5.6 | 3.4 | 3.4 | — | 5.6 | 35.8 | 14.6 | 12.7 |
| US Sieve Number 40-60 | 0.8 | 1.0 | 1.0 | — | 0.8 | 2.9 | 2.9 | 1.2 |
| Volume Density of Dried Powder, Lb./Ft.$^3$ | 20 | 20 | 20 | 20 | 20 | — | — | — |

[a]Dietert procedure.

TABLE V

| Example | 1 | 2 | 3A | 3B | 3C | 4A | 4B | 6 |
| --- | --- | --- | --- | --- | --- | --- | --- | --- |
| Apparent Viscosity at 200° C., poise × 10$^{-5}$ at | | | | | | | | |
| 0.88 sec$^{-1}$ | 75.3 | 70.9 | 70.9 | 75.3 | 70.9 | 86.8 | 88.6 | 15.0 |
| 8.8 sec$^{-1}$ | 10.2 | 11.7 | 11.7 | 10.2 | 9.3 | 8.8 | 11.3 | 3.0 |
| 88 sec$^{-1}$ | 1.2 | 1.5 | 1.5 | 1.2 | 1.1 | 1.2 | 1.4 | 0.6 |
| 294 sec$^{-1}$ | 0.4 | 0.5 | 0.5 | 0.4 | 0.4 | 0.4 | 0.5 | 0.3 |
| 440 sec$^{-1}$ | 0.3 | 0.4 | 0.4 | 0.3 | 0.3 | 0.3 | 0.4 | 0.2 |
| 1469 sec$^{-1}$ | 0.1 | 0.2 | 0.2 | 0.2 | 0.1 | 0.1 | 0.2 | 0.1 |
| Melt Fracture at Shear Rate, sec$^{-1}$ | <0.88 | 0.88 | 0.88 | <0.88 | <0.88 | <0.88 | <0.88 | <0.88 |
| Room Temperature | | | | | | | | |
| 100% Modulus, psi | 480 | 480 | 480 | 480 | — | 380 | 330 | 110 |
| Tensile Strength, psi | 3496 | 3890 | 3890 | 3500 | — | 2400 | 510 | 670 |
| Elongation, % | 395 | 430 | 430 | 400 | — | 400 | 190 | 700 |
| 70° C. | | | | | | | | |
| 100% Modulus, psi | 290 | 350 | 350 | 290 | — | 380 | — | 90 |
| Tensile Strength, psi | 580 | 820 | 820 | 580 | — | 930 | 190 | 100 |
| Elongation, % | 260 | 290 | 290 | 290 | — | 290 | 60 | 390 |

Example 2

Zinc-neutralized sulfonate EPDM powders were prepared according to the process described in Example I. The EPDM used contained about 55 wt. % ethylene and 5.0 wt. % 5-ethylidene-2-norbornene and had a Mooney viscosity of about 20 (ML, 1+8, 212° F.). Titration of a sample of unneutralized sulfonated polymer in toluene/methanol solution with ethanolic sodium hydroxide showed it to contain about 31 meq. of sulfonate groups/100 g polymer. Elemental analysis and particle size distribution are given in Table IV. The powder had a narrow overall size distribution with almost 96% falling within the range of 10–20 mesh. Rheological and stress-strain properties of molded powder are given in Table V.

Example 3

A series of three metal neutralized sulfonated EPDM polymers were made directly into powders following The sulfonated polymer was then neutralized with 60 milliequivalents of zinc acetate per 100 g EPDM dissolved in a methanol-water solution. The neutralized cement was stabilized by the addition of 0.1 gm of Irganox-1010 per 100 gm EPDM. Zinc neutralized sulfonated EPDM polymers were then finished as powders according to the process described in Example 1.

The properties and compositions of these three materials are given in Tables IV and V.

The resultant powders had a particle size of about 15 to 20 mesh, as shown in Table VIII. The powders were free flowing and did not agglomerate or block when packaged and stored under loads of about 2 psi at room temperature for 1 month. The volume density of these powders was about 20 lbs/cu. ft.

This example illustrates the preparation of free flowing fine powders from EPDM's of a wide variety of base compositions.

Example 4

A set of sulfonated EPDM powders was prepared in which two metal acetates were used for neutralization. The starting EPDM is described in Example 2, and the preparation procedure was done according to Example 1. One batch of unneutralized sulfonated polymeric cement was neutralized with a sodium acetate solution and the other neutralized with a magnesium acetate solution.

The metal acetate solutions were prepared by dissolving 1.297 pounds of $Mg(OOCCH_3)_2 \cdot 4 H_2O$ and 0.98 pounds of $NaOOCCH_3$, respectively, in a mixture of 1.91 gallons of methanol and 0.096 gallon of water. The amount of metal acetate used corresponds to 60 meq. of metal ion per 100 g EPDM. The metal acetate solutions were added to the sulfonated cements to effect neutralization as described in Example 1. These neutralized cements were then formed into powders in the "hi-shear" pipeline mixer, steam stripped and fluid bed dried according to the process described in Example 1.

The elemental analyses, powder particle size distributions, physical and rheological properties of the finished powders are given in Tables IV and V. The finished powders were subjected to storage under a load of about 2 psi for one month and found to remain as free flowing powders with no agglomeration. The volume density of the dried powder was about 20 pounds per cubic foot.

This example shows the application of this direct in-process powder process for the production of powdered metal neutralized sulfonated EPDM polymers containing various metal counter-ions.

Example 5

An ammonium neutralized sulfonated EPDM plasticized with zinc stearate was prepared into a powder by the process described in Example 1.

The ammonium sulfonated polymer cement was prepared by dissolving 20 pounds of an EPDM in 23.87 gallons of hexane. The EPDM used is described in Example 2. Sulfonation was effected as described in Example 1, and the sulfonated EPDM was neutralized through the addition of 0.925 pound of anhydrous ammonium acetate dissolved in 1.91 gallons of methanol and 0.096 pound of water. To the neutralized cement was added 1.90 pounds of zinc stearate plasticizer and 0.02 pound of Irganox 1010. The cement was agitated for an additional 2 hours. The cement was then processed through the "hi-shear" mixer, steam stripped and fluid-bed dried resulting in a powdered product as described in Example 1.

This zinc stearate plasticized ammonium neutralized sulfonated EPDM powder was free-flowing with an average particle size of about 10 to 20 mesh. The product powder showed no tendency toward agglomeration on storage at room temperature under a load of about 2 psi for 1 month.

Example 6

Following the procedure described in Example 1, an amine neutralized sulfonated EPDM powder was produced. The starting EPDM is described in Example 2. The sulfonated polymer was neutralized through the addition of a solution containing 0.98 pound of anhydrous ammonium acetate dissolved in 1.91 gallons of methanol and 0.096 gallon of water. Irganox 1010 (0.02 pounds) was added and the reaction was maintained with agitation for an additional 30 minutes. The viscosity of the final cement was determined with a Brookfield viscometer, model LVT, with spindle No. 3 at room temperature.

| RPM | Viscosity, cps |
|---|---|
| 0.3 | 4000 |
| 0.6 | 5000 |
| 1.5 | 4800 |
| 3.0 | 4600 |
| 6.0 | 4800 |
| 12.0 | 3100 |
| 30.0 | 3720 |
| 60.0 | 3900 |

The cement was then processed through the "hi-shear" mixer with hot water to generate powder and the powder was then steam stripped, and fluid bed dried as described in Example 1.

This ammonium neutralized sulfonated EPDM powder was free-flowing with a particle size ranging between 10 and 20 mesh. No tendency for agglomeration of the powder particles was observed on storage at room temperature under a load of about 2 psi for 1 month.

The composition and physical and rheological properties of this ammonium neutralized sulfonated EPDM are given in Tables IV and V.

This example demonstrates that free-flowing powders of ammonium neutralized systems of small and uniform particle size can be efficiently produced via this process.

Example 7

SAMPLE A

A zinc sulfonate EPDM plasticized with stearic acid and an oil was prepared from the EPDM described in Example 1 according to the procedure of Example 1. Sulfonation was effected on a cement of 14.5 pounds EPDM in 17.3 gallons of hexane with 1.15 pounds of acetic anhydride and 0.495 pounds of concentrated sulfuric acid. The sulfonated polymer was neutralized with a solution of 1.89 pounds of zinc acetate in 1.38 gallons of methanol and 0.07 gallons of water. After 30 minutes of agitation, 1.23 pounds of stearic acid and 0.014 pounds of Irganox 1010 were added. After 2 hours of agitation, 6.5 pounds of a paraffinic rubber process oil, Sunpar 2280, was added. This corresponds to 75 parts by weight of oil per 100 parts by weight of the neutralized sulfonated polymer.

The unplasticized neutralized polymer contained 35.1 meq. sulfonate and 117.6 meq. zinc/100 g EPDM.

SAMPLE B

Twenty pounds of an unplasticized zinc-neutralized sulfonated EPDM gum was dissolved in 23.87 gallons of hexane and 3.58 gallons of isopropyl alcohol. The gum used was prepared according to the procedure described for Sample A except that the 20 Mooney EPDM described in Example 2 was used. According to sulfur and zinc analyses the modified polymer contained 31.4 meq. sulfonate and 56.8 meq. zinc per 100 g polymer. To the cement was added 1.90 pounds of zinc stearate. The cement was agitated for approximately 2 hours to allow for complete solution of the zinc stearate. To the cement was then added 10.6 pounds of a paraffinic process oil, Sunpar 2280, which corresponds to 50 parts by weight of oil per 100 parts by weight of the neutralized sulfonated polymer.

The unplasticized neutralized polymer contained 36.7 meq. sulfonate and 91.6 meq. zinc/100 g EPDM. The physical and rheological properties of the plasticized and unplasticized systems are given in Table VI.

The oil-extended cements were formed into powders, isolated and finished using the same procedure as is described in Example 1. The addition of the process oil resulted in lower neutralized cement solution viscosity than is obtained in cements of the same gum compositions without the oil present, as is shown in Table VII. The resulting powders of these materials had a particle size ranging from 10 to 20 mesh with an overall size distribution as shown in Table VI. The volume density of the resultant powders was about 20 pounds/cu. ft. The powders were stored under a 1.5 psi weight for one month and remained as free-flowing powders with no agglomeration observed.

As can be seen in Table VI the melt viscosity of these materials is relatively low due to the incorporation of the process oil. However, even at these levels of oil, an excellent powder was produced and maintained throughout all the process steps and in load storage.

TABLE VI

RHEOLOGICAL PROPERTIES
APPARENT VISCOSITY
AT 200° C., POISE × 10$^{-5}$

| Example | 0.88 sec$^{-1}$ | 8.8 sec$^{-1}$ | 88 sec$^{-1}$ | 294 sec$^{-1}$ | 440 sec$^{-1}$ | 1469 sec$^{-1}$ | Melt Fracture Shear Rate, sec$^{-1}$ |
|---|---|---|---|---|---|---|---|
| 7A | | | | | | | |
| 74 phr oil | 3.2 | 0.8 | 0.2 | 0.06 | 0.05 | 0.02 | 88 |
| no oil | 34.6 | 6.1 | 0.8 | 0.3 | 0.2 | 0.1 | 0.88 |
| 7B | | | | | | | |
| 50 phr oil | 2.8 | 0.9 | 0.2 | 0.1 | 0.07 | 0.03 | 1469 |
| no oil | 14.9 | 3.3 | 0.7 | 0.3 | 0.2 | 0.1 | 294 |

STRESS-STRAIN PROPERTIES
(Room temperature)

| Example | Tensile Strength psi | 100% Modulus psi | Elongation at Break % |
|---|---|---|---|
| 7A | 2810 | 210 | 705 |
| 7B | 3480 | 235 | 640 |

DRIED POWDER PARTICLE SIZE

| U.S. Sieve Number | Example 7B |
|---|---|
| 10-20 | 79-1 |
| 20-40 | 20.1 |
| 40-60 | 0.8 |

TABLE VII

NEUTRALIZED SOLUTION BROOKFIELD VISCOSITITES
Brookfield Viscometer Model LVT
Spindle #3
Room Temperature
Viscosity, cps.

| | Sample A | Sample B |
|---|---|---|
| RPM | 75 phr Oil | 50 phr Oil |
| 0.3 | 4000 | — |
| 0.6 | 5000 | 2600 |
| 1.5 | 4800 | 2720 |
| 3.0 | 4560 | 2880 |
| 6.0 | 4200 | 2880 |

TABLE VII-continued

NEUTRALIZED SOLUTION BROOKFIELD VISCOSITITES
Brookfield Viscometer Model LVT
Spindle #3
Room Temperature
Viscosity, cps.

| | Sample A | Sample B |
|---|---|---|
| RPM | 75 phr Oil | 50 phr Oil |
| 12.0 | 3930 | 2990 |
| 30.0 | 3076 | 2850 |
| 60.0 | — | — |

Example 8

Zinc stearate and stearic acid have been found to be effective ionic plasticizers for metal neutralized sulfonated EPDM terpolymers. The presence of these plasticizers in metal sulfonated EPDM results in the lowering of the melt viscosity sufficiently to allow for processability in operations such as injection molding and extrusion. This series of runs demonstrates that small particle size powders of these plasticized materials can be produced directly in process through the use of an in-line "hi-shear" mixer as described in Example 1. Further, these resultant powders remain as free-flowing powders without any agglomeration during the steam stripping process, the drying process or in subsequent shelf storage conditions. Table VIII lists the ingredients and quantity used for each composition studied. Three EPDM's were used and are described below.

| Type | Mooney Viscosity (ML, 1 + 8, 212° F.) | Ethylene Content, Wt. % | ENB Content, Wt. % |
|---|---|---|---|
| MD-76-3 | 20 | 75 | 5 |
| MD-76-5 | 20 | 55 | 5 |
| R-521 | 40 | 50 | 5 |

The preparation procedure followed for this series of compositions is as described below. The EPDM was dissolved in n-hexane and sulfonated by the addition of acetic anhydride followed by concentrated sulfuric acid. Samples of this unneutralized sulfonated polymer were taken for sulfur analysis. After allowing the sulfonation reaction to proceed for 60 minutes, the sulfonated polymers were neutralized with a solution of the appropriate metal acetate dissolved in methanol and water. The neutralization reaction was allowed to proceed for 30 minutes, at which time the appropriate plasticizer was added as a dry powder. After an additional 15 minutes of agitation, Irganox 1010 was added. The plasticized and neutralized sulfonated EPDM cements were then isolated and finished as powders. The cement was pumped from the reactor through the in-line "hi-shear" mixer nozzle and pump assembly. In the nozzle the cement was contacted with 65° C. water. The cement flow rate was about 0.5 GPM and the water flow rate was about 2.8 GPM. On passing through the tandem shear head assembly of the mixer, the cement was broken into small discrete particles that were dispersed into the water to form a slurry. The use of hot water improves the shearing efficiency in the "hi-shear" mixer. On contact with water the cement viscosity increases rapidly and, in the presence of sufficient water, the cement forms a gel. It has been found, surprisingly, that the efficiency of powder formation improves as the viscosity of the cement increases. By contacting the cement with hot water significant solvent flashing from the cement occurs rapidly as the water-cement system passes through the shear heads of the in-line mixer. Since the rate of solvent flashing is a function of particle size or particle surface area, as the shearing process takes place and generates small polymeric cement particles, very rapid and efficient solvent flashing occurs. This removal of a significant fraction of the original solvent from the polymeric cement results in a material whose properties are approaching those of the isolated neutralized sulfonated EPDM itself. As the tenacity of the cement increases due to the incorporation of water and to the flashing off of the solvent, the shearing action of the mixer produces smaller, more uniform particles. The water-cement slurry was then piped into the steam stripper where the remaining solvent was flashed off. The wet powder was then dried in a Fitzpatrick FA-75 fluid bed drier to a final moisture content of less than 1 weight % water. Table IX gives the sulfur and metal contents of the gums described in this series. The tensile strengths of the gums were determined using microdumbbels at both room temperature and 70° C. with an Instron TM table model instrument at a pull rate of 2 inches per minute. The melt viscosities of the samples were determined with an Instron table model capillary rheometer at 200° C. over various shear rates. These data are given in Table X. The described method for the direct in-process manufacture of powders from plasticized and metal-neutralized sulfonated EPDM shows the process to be applicable for material with melt flow viscosities down to about $5 \times 10^5$ dynes/cm$^2$ at a shear rate of 0.88 sec$^{-1}$ (as shown in Table X). The solution viscosities of the plasticized-neutralized cements are given in Table XI. The resulting powders showed no tendency to agglomerate in-process, through either the stripping or fluid bed drying steps. The particle size of the isolated dry powders ranged from 10 to 20 mesh with an overall narrow particle size distribution as shown in Table XII. These powders remained in a free-flowing form after 1 month storage under a 1.5 psi load. The volume density of the powders ranged from 15 to 25 pounds per cubic foot.

TABLE VIII

| Example | Type | Pounds | Hexane, Gal | Acetic Anhydride Pounds | Conc. H$_2$SO$_4$ Pounds | Counter Ion Type | Pounds |
|---|---|---|---|---|---|---|---|
| 8A | MD-76-5 | 20 | 23.87 | 1.591 | 0.685 | Zn(OAc)$_2$.2 H$_2$O | 2.623 |
| 8B | R-521 | 28.87 | 23.87 | 2.297 | 0.989 | Zn(OAc)$_2$.2 H$_2$O | 3.786 |
| 8C | MD-76-5 | 20 | 23.87 | 1.591 | 0.685 | Zn(OAc)$_2$.2 H$_2$O | 1.317 |
| 8D | MD-76-5 | 20 | 23.87 | 1.591 | 0.685 | Zn(OAc)$_2$.2 H$_2$O | 1.317 |
| 8E | MD-76-5 | 20 | 23.87 | 1.591 | 0.685 | Mg(OAc)$_2$.4 H$_2$O | 1.287 |
| 8F | MD-76-5 | 20 | 23.87 | 1.151 | 0.494 | Zn(OAc)$_2$.2 H$_2$O | 1.317 |
| 8G | MD-76-3 | 20 | 23.87 | 1.151 | 0.494 | Zn(OAc)$_2$.2 H$_2$O | 1.317 |

| Example | Plasticizer Type | Pounds | Methanol Gal | Water Gal | Irganox 1010 Pounds |
|---|---|---|---|---|---|
| 8A | StCOOH | 1.70 | 1.91 | 0.096 | 0.02 |
| 8B | StCOOH | 2.454 | 2.756 | 0.138 | 0.0289 |
| 8C | Zn(St)$_2$ | 1.90 | 1.91 | 0.096 | 0.02 |
| 8D | Zn(St)$_2$ | 3.00 | 1.91 | 0.096 | 0.02 |
| 8E | Zn(St)$_2$ | 1.90 | 1.91 | 0.096 | 0.02 |
| 8F | Zn(St)$_2$ | 1.267 | 2.721 | 0.136 | 0.02 |
| 8G | Zn(St)$_2$ | 1.267 | 2.721 | 0.136 | 0.02 |

OAC stands for the acetate group, CH$_3$COO—
ST stands for the stearyl group, C$_{17}$H$_{35}$COO—
STCOOH stands for stearic acid, C$_{17}$H$_{35}$COOH

TABLE IX

| Example | Sulfonate Sulfur Wt % | Meq/100 g EPDM | Metal Content Type | Wt % | Meq/100 g EPDM |
|---|---|---|---|---|---|
| 8A | 0.89 | 31.6 | Zn | 2.19 | 76.1 |
| 8B | 0.89 | 31.6 | Zn | 1.99 | 68.9 |
| 8C | 0.99 | 35.8 | Zn | 2.59 | 91.8 |
| 8D | 0.95 | 36.1 | Zn | 2.95 | |
| 8E | 0.94 | 35.6 | Mg/Zn | 0.57/0.66 | 53.4/23.0 |
| 8F | 0.67 | 23.0 | Zn | 1.78 | 60.0 |
| 8G | 0.68 | 23.4 | Zn | 1.85 | 62.4 |

TABLE X

RHEOLOGICAL PROPERTIES
APPARENT VISCOSITY
AT 200° C., POISE × 10$^{-5}$

| Example | 0.88 sec$^{-1}$ | 8.8 sec$^{-1}$ | 88 sec$^{-1}$ | 294 sec$^{-1}$ | 440 sec$^{-1}$ | 1469 sec$^{-1}$ | Melt Fracture Shear Rate, sec$^{-1}$ |
|---|---|---|---|---|---|---|---|
| 8A | 15.0 | 3.6 | 0.7 | 0.3 | 0.2 | 0.08 | 0.88 |
| 8B | 34.6 | 6.1 | 0.8 | 0.3 | 0.2 | 0.09 | <0.88 |
| 8C | 14.9 | 3.3 | 0.7 | 0.3 | 0.2 | 0.08 | <0.88 |
| 8D | 7.2 | 1.9 | 0.4 | 0.2 | 0.1 | 0.05 | 294 |
| 8E | 65.6 | 9.2 | 1.2 | 0.4 | 0.3 | 0.1 | 8.8 |
| 8F | 6.9 | 1.9 | 0.5 | 0.2 | 0.2 | 0.06 | 29 |
| 8G | 6.0 | 1.9 | 0.5 | 0.2 | 0.2 | 0.06 | 29 |

STRESS STRAIN PROPERTIES

| Sample | Room Temperature | | | 70° C. | | |
|---|---|---|---|---|---|---|
| | Tensile | 100% Modu- | Elongation At | Tensile | 100% Modu- | Elongation At |

TABLE X-continued

| Number | Strength Psi | lus Psi | Break % | Strength Psi | lus Psi | Break % |
|---|---|---|---|---|---|---|
| 8A | 4470 | 470 | 475 | 810 | 280 | 460 |
| 8B | 5540 | 470 | 540 | 850 | 240 | 550 |
| 8C | 2860 | 540 | 413 | 760 | 270 | 410 |
| 8D | 5550 | — | 480 | — | — | — |
| 8E | 2890 | 440 | 400 | — | 330 | — |
| 8F | 2820 | 350 | 450 | 460 | 190 | 470 |
| 8G | 4420 | 430 | 480 | 430 | 180 | 460 |

TABLE XI
BROOKFIELD VISCOSITY OF NEUTRALIZED CEMENTS (BROOKFIELD VISCOMETER, MODEL LVT)

| Example RPM | Viscosity, Cps | | | |
|---|---|---|---|---|
| | 8A | 8E | 8F | 8G |
| 0.3 | — | 26000 | 6000 | 28000 |
| 0.6 | 3000 | 37000 | 7000 | 21000 |
| 1.5 | 3600 | 30400 | 4400 | 15600 |
| 3.0 | 2800 | 28800 | 4400 | 13400 |
| 6.0 | 2700 | 32000 | 4200 | 12500 |
| 12.0 | 3600 | 26250 | 4700 | 10650 |
| 30.0 | 2980 | — | 3880 | 9650 |
| 60.0 | 2880 | — | 3902 | 8520 |

SPINDLE 3
ROOM TEMPERATURE

TABLE XII
DRIED POWDER PARTICLE SIZE
RETAINED POWDER, WT %

| U.S. SIEVE NUMBER | SAMPLE A | SAMPLE B | SAMPLE C | SAMPLE D | SAMPLE E | SAMPLE F | SAMPLE G |
|---|---|---|---|---|---|---|---|
| 10–20 | 79.4 | 89.7 | 65.8 | 48.6 | 70.4 | 81.3 | 85.9 |
| 20–40 | 20.6 | 9.2 | 30.8 | 46.1 | 27.0 | 17.8 | 13.5 |
| 40–60 | 0.1 | 1.1 | 2.4 | 5.3 | 2.6 | 0.9 | 0.6 |

Example 9

A compound was made from the powder of zinc sulfonate EPDM described in Example 2. To a midget Banbury was charged 66.9 gm of this zinc-neutralized sulfonated EPDM powder. Then 100.3 gm of Tufflo 6056 oil and 132.7 gm of blended powdered additives were added. This blend of additives contained 12.0 gm of zinc stearate, 100.3 gm of Imsil A-108, 20.1 gm of polypropylene, MFR-20 and 0.3 gm of stabilizer. The mix was run for 5 minutes and the compound was dumped at a temperature of 160° C.

It was found surprisingly that this mix procedure in which the zinc sulfonate EPDM powder was added first gave a very well-dispersed, homogeneous mix. This is not the case with large-size crumb, ¼" and larger, which require the oil fillers, particularly the zinc stearate, to be added first in order to achieve a homogeneous mix.

The mechanical and physical properties of the final compound are given below.

| Shore A (15 sec) | 60 |
|---|---|
| Room Temperature | |
| Tensile, psi | 910 |
| Elongation at Break, % | 550 |
| Tensile Set, % | 40 |
| 70° C. | |
| Tensile, psi | 450 |
| Elongation at Break, % | 680 |
| Flow | |
| Spiral, cm | 34.5 |

Example 10

A zinc-neutralized sulfonated EPDM cement was prepared from the EPDM described in Example 3C according to the procedure described in Example 1. The cement was pumped from the reactor into the nozzle assembly of an in-line "hi-shear" mixer and contacted with 20° C. water. The water was held at a flow rate of 2.85 gallons per minute and the cement flow rate was maintained at 1500 ml/min. This water-cement mixture then passed through the "hi-shear" mixer where the cement was dispersed as a slurry into the water. The 2" Greerco "hi-shear" pipeline mixer was fitted with the standard Greerco tandem shear head configuration. This consists of a two-stage mixing head system with two turbines and stators in tandem. The primary stator has eight 7/16" diameter holes and the multiport stator has 50 ⅛" ports.

A series of runs was made in which the speed of the Greerco mixer was varied from about 10,000 RPM to about 6,000 RPM. At 6,000 RPM's very poor dispersions of the cement into the water were realized. At 10,000 RPM's the cement was dispersed as discrete particles into the water with a size of about 10 mesh. The powder was then steam stripped and fluid bed dried.

Example 11

The zinc-neutralized sulfonated EPDM cement prepared in Example 10 was used to determine the effect of water temperature on process efficiency and powder particle size. This cement was processed through the equipment setup and procedures described in the above example. Water temperatures of 20°, 55°, 65° and 90° C. were investigated. The water flow rate was held at 2.85 gallons per minute, a cement flow rate of 3680 ml/minute was used and the mixer was run at 10,000 RPM.

With the water temperature at 20° C., a very coarse crumb was produced. This crumb had a particle size of about ⅛" to ¼". At 65° and 90° C. a fine, uniform powder, well dispersed in the water was produced. This powder had a particle size of about 10 mesh.

Example 12

The zinc sulfonate EPDM described in Example 2 was used to make a compound following dry blending techniques. The formulation ingredients were as follows:

| Sulfonated Elastomer | 100 parts |
|---|---|
| $(C_{17}H_{35}COO)_2Zn$ | 18 parts |
| Tufflo 6056 | 150 parts |
| Imsil A-108 | 150 parts |
| CD-460, Polypropylene | 30 parts |

-continued

| | | |
|---|---|---|
| DSTDP, Stabilizer | 0.4 | parts |
| Irganox - 1010 | 0.4 | parts |
| TiO$_2$ | 4.0 | parts |

The powdered sulfonate elastomer was placed into a one-gallon laboratory Waring blender and with slow agitation the process oil was added. The agitation was increased to maximum and maintained for about 20 seconds. The oil-soaked powder, which remained as a free-flowing powder was then transferred to a 4-liter beaker and the remaining fillers were added. The mixture was then stirred by hand until visual observation suggested a homogeneous mix had been obtained.

The homogeneous dry blend was then fed into a Boy injection molding machine. Samples were molded at 220°, 240°, and 260° C. with no process difficulties. Properties of the samples molded at 220° C. are given below and compared to properties of the same compound prepared in a Banbury. The Banbury samples were prepared from the same batch of powdered gum as was used for the dry blends.

| | Dry Blend | Banbury |
|---|---|---|
| Room temperature | | |
| Shore A | 66 | 63 |
| Tensile, psi | 780 | 910 |
| Elongation at Break % | 690 | 550 |
| Die C Tear, ppi | 190 | 200 |
| Spiral Flow, cm | 35.2 | 34.5 |

Example 13

A zinc sulfonate EPDM cement was prepared exactly as described in Example 10. The cement was pumped from the reactor into the nozzle assembly of the in-line mixer (as shown in FIG. 1) and contacted with water at about 20° C. On contact with the water, the viscosity of the cement experienced a marked increase going from a fluid with a viscosity of about 3,000 cps (Brookfield LVT viscometer, at 25° C., #3 spindle, 6 RPM) to a gel. The gel was then broken into small, discrete particles and dispersed into the water as the water-gel system passed through the shearing heads of the in-line "hi-shear" mixer. The powder was then steam stripped and fluid bed dried. With this cement, a series of runs was made in which the flow rates of water to cement through the "hi-shear" mixer was varied (Table XIII). The water temperature was held at 5° to 10° C. and the water flow rate held at about 2.8 gallons per minute. The cement temperature was approximately 25° C. and the cement flow rate varied between 0.2 and 0.64 gallons per minute. Under all conditions the dried product powder particle size was between 10 and 20 mesh. The resultant products were free-flowing powders and did not agglomerate when stored in bags at room temperature for 2 weeks.

This example demonstrates the process latitude available in variations of the water-to-cement ratio for the production of powdered metal neutralized sulfonated EPDM's.

TABLE XIII

| Run Number | Cement Rate GPM | Water Rate GPM | Flow Ratio H$_2$O/Cement | Powder Particle Size U.S. Mesh |
|---|---|---|---|---|
| 1 | 0.2 | 2.8 | 14.0/1 | 10-20 |

TABLE XIII-continued

| Run Number | Cement Rate GPM | Water Rate GPM | Flow Ratio H$_2$O/Cement | Powder Particle Size U.S. Mesh |
|---|---|---|---|---|
| 2 | 0.56 | 2.8 | 5.00/1 | 10-20 |
| 3 | 0.64 | 2.8 | 4.41 | 10-20 |

Example 14

A copper-neutralized, sulfonated polystyrene cement was prepared in this example by dissolving 200 gm of polystyrene in 1000 ml of dichloroethane. The starting polystyrene had a number average molecular weight of 230,000, a weight average molecular weight of 375,000 and an ASTM-D-1238 condition G melt index of 18 grams in 10 minutes. The polystyrene (200 g) was dissolved in 1000 ml of 1,2-dichloroethane at 50° C. To the 50° C. solution was added 122.5 ml of acetic anhydride followed by 44.9 ml of concentrated sulfuric acid. The reaction mixture was then stirred for one hour. The sulfonated polystyrene was neutralized with a solution of 191.7 gm of copper acetate di-hydrate dissolved in 500 ml of dimethyl formamide. The cement was then agitated for an additional hour, then cooled to room temperature.

The cement was then broken up into small, discrete particles suspended in water using a Waring Blender. The blender was charged with approximately one volume of cement to one volume of 20° C. water. The cement-water slurry was then steam stripped in a four-liter beaker fitted with a high-speed agitator. After stripping the powdered product was dried in a vacuum oven at 100° C.

The dried neutralized powder contained 5.4 weight % sulfur (21.6 mole % sulfonate) and 5.9 weight % copper. The final product particle size was less than 100 mesh.

This example demonstrates the preparation of powders from high sulfonate content polymers.

Example 15

Butyl 365 (Exxon Chemical Co.) was depolymerized in a hot extruder from its original Mooney viscosity (M.L., 1+8, 212° F.) of about 45 to a Mooney viscosity of below 5. Butyl 365 contains about 2 mole percent unsaturation. To a solution of 200 gm of depolymerized Butyl 365 in 2000 ml of hexane at room temperature was added 20.1 ml of acetic anhydride followed by 7.5 ml of concentrated sulfuric acid. After 30 minutes the sulfonated Butyl rubber was neutralized with a solution of 26.3 gm of zinc acetate dihydrate in 160 ml of methanol and 8 ml of water. Irganox 1010 (0.2 gm) was then added, and the cement was stirred for one hour.

The cement was then broken up into small, discrete particles suspended in water using a Waring blender. The blender was charged with approximately one volume of cement to one volume of 20° C. water. The cement-water slurry was then steam stripped in a four-liter beaker fitted with a high speed agitator. After stripping the powdered zinc neutralized sulfonated butyl was dried in a laboratory fluid bed dryer to a final moisture content of less than 1 wt. % water.

The dried neutralized powder contained 1.54 wt. % sulfur (51.6 meq. sulfonate/100 g polymer) and 2.96 wt. % zinc (97.1 meq Zn/100 g polymer). The dried powder had a particle size range of between 10 and 20 mesh.

The powder remained as a free-flowing powder when stored under a 2 psi load for one week.

Example 16

The applicability of the direct in-process manufacture of zinc sulfonate containing EPDM polymers at sulfur levels of 20 to 25 meq sulfonate groups/100 g EPDM was studied using two different ethylene content EPDM's.

Sample A was made from an EPDM containing about 55 wt. % ethylene and 5 wt. % 5-ethylidene-2-norbornene and having a Mooney viscosity of about 20 (ML, 1+8, 212° F.), and Sample B from an EPDM containing about 70 wt. % ethylene and 5 wt. % 5-ethylidene-2-norbornene and having a Mooney viscosity of about 20 (ML, 1+8, 212° F.). To a solution of 20 pounds of EPDM in 23.9 gallons of hexane at room temperature was added 1.51 pounds of acetic anhydride followed by 0.49 pounds of concentrated sulfuric acid. After 30 minutes the sulfonation was terminated, and the unneutralized sulfonated polymer was neutralized through the addition of a solution containing 1.32 pounds of zinc acetate dissolved in 2.72 gallons of methanol and 0.14 gallon of water. After 30 minutes of reaction with agitation 1.27 pounds of dry zinc stearate and 0.02 pound of Irganox 1010 were sprinkled into the reaction vessel. Mixing was continued for an additional 90 minutes to complete the batch. The products were then processed through isolation, stripping and drying to produce powders according to the methods described in Example 1.

Table XIV lists the compositions, rheological, and stress-strain properties of the finished gums as well as the particle size distributions of the powders. The neutralized cement viscosities for these systems are given in Table XV.

The resultant powders from both systems were free flowing and showed no agglomeration through storage under loads of about 2 psi at room temperature for one month.

This example shows the application of this powder process technique to metal-sulfonate containing EPDM systems at lower sulfonate levels.

TABLE XIV

| | COMPOSITION | | | |
|---|---|---|---|---|
| | Sulfur | Sulfonate, | | Zinc Content |
| Example | Wt. % | Meq./100g EPDM | Wt. % | Meq./100g EPDM |
| 16A | 0.67 | 23.0 | 1.78 | 60.0 |
| 16B | 0.68 | 23.4 | 1.85 | 62.4 |

RHEOLOGICAL PROPERTIES
APPARENT VISCOSITY
AT 200° C., POISE × $10^{-5}$

| Example | 0.88 $sec^{-1}$ | 8.8 $sec^{-1}$ | 88 $sec^{-1}$ | 294 $sec^{-1}$ | 440 $sec^{-1}$ | 1469 $sec^{-1}$ | Melt Fracture Shear Rate, $sec^{-1}$ |
|---|---|---|---|---|---|---|---|
| 16A | 6.9 | 1.9 | 0.5 | 0.2 | 0.15 | 0.06 | 29 |
| 16B | 6.0 | 1.9 | 0.5 | 0.2 | 0.15 | 0.06 | 29 |

STRESS-STRAIN PROPERTIES

| | Room Temperature | | | 70° C. | | |
|---|---|---|---|---|---|---|
| Example | Tensile Strength psi | 100% Modulus psi | Elongation at Break % | Tensile Strength psi | 100% Modulus psi | Elongation at Break % |
| 16A | 2820 | 350 | 450 | 460 | 190 | 470 |
| 16B | 4420 | 430 | 480 | 430 | 180 | 460 |

DRIED POWDER PARTICLE SIZE

| U.S. Sieve Number | Retained Powder Weight % | |
|---|---|---|
| | Example 16A | Example 16B |
| 10–20 | 81.3 | 85.9 |
| 20–40 | 17.8 | 13.5 |
| 40–60 | 0.9 | 0.6 |

TABLE XV

BROOKFIELD VISCOSITY OF NEUTRALIZED CEMENT
(BROOKFIELD VISCOMETER MODEL LVT,
SPINDLE #3,
ROOM TEMPERATURE)

| Example RPM | 16A | 16B |
|---|---|---|
| | Viscosity, CPS | |
| 0.3 | 6000 | 28000 |
| 0.6 | 7000 | 21000 |
| 1.5 | 4400 | 15600 |
| 3.0 | 4400 | 13400 |
| 6.0 | 4200 | 12500 |
| 12.0 | 4700 | 10600 |
| 30.0 | 3880 | 9500 |
| 60.0 | 3900 | 8500 |

Example 17

A metal neutralized EPDM powder was produced in which the sulfonation was carried out on an 18 wt. % solid EPDM in hexane cement. The EPDM used was Royalene 521, manufactured by Uniroyal Chemical Company. This EPDM contained about 49 wt. % ethylene and 4.9 wt. % 5-ethylidene-2-norbornene and had a Mooney viscosity of about 45 (ML, 1+8, 212° F.). The equipment and processing procedures used for preparation, isolation, stripping and drying of the polymer were identical to those described in Example 1. 28.87 pounds of EPDM were dissolved in 23.87 gallons of hexane. This yielded a starting EPDM cement containing 18 Wt. % solid. Table XVI gives the solution viscosity at room temperature of this cement over a range of shear rates. To the cement was added 2.297 pounds of acetic anhydride followed by 0.989 pound of concentrated sulfuric acid. After 30 minutes the sulfonation was terminated and the sulfonated polymer was neutralized through the addition of a solution of 3.79 pounds of zinc acetate in 2.6 gallons of methanol and 0.14 gallons of water. After 30 minutes of agitation, 2.45 pounds of stearic acid and 0.029 pounds of Irganox 1010 were added. Table XVII gives the cement viscosity over a range of shear rates.

This high viscosity cement was processed through the "hi-shear" mixer under the same conditions as were used in the preceding examples with the same process efficiency. The resulting product was a free-flowing powder with a particle size range between 10 and 20 mesh (see Table XVIII). The composition, physical and rheological properties of this material are given in Table XVIII.

These results demonstrate that free-flowing, small-size powders can be efficiently produced with cements containing up to 18 wt. % solids and having solution viscosities up to 50,000 cps.

TABLE XVI

BROOKFIELD VISCOSITY OF EPDM-HEXANE CEMENT

| RPM | Viscosity, CPS |
|---|---|
| 0.3 | 6000 |
| 0.6 | 6200 |
| 1.5 | 6080 |
| 3.0 | 6360 |
| 6.0 | 6260 |
| 12.0 | 6170 |

TABLE XVII

BROOKFIELD VISCOSITY OF NEUTRALIZED-CEMENT

| RPM | VISCOSITY, CPS |
|---|---|
| 0.3 | 50400 |
| 0.6 | 46000 |
| 1.5 | 38560 |
| 3.0 | 34680 |

TABLE XVIII

| COMPOSITION | | | |
|---|---|---|---|
| Sulfur | Sulfonate | Zinc Content | |
| Wt. % | Meq/100g EPDM | Wt. % | Meq/100g EPDM |
| 0.89 | 31.5 | 1.99 | 68.9 |

DRIED POWDER PARTICLE SIZE

| U.S. Sieve Number | Retained Powder Wt. % |
|---|---|
| 10–20 | 89.7 |
| 20–40 | 9.2 |
| 40–60 | 1.1 |

RHEOLOGICAL PROPERTIES
APPARENT VISCOSITY
AT 200° C., POISE × $10^{-5}$

| 0.88 $sec^{-1}$ | 8.8 $sec^{-1}$ | 88 $sec^{-1}$ | 294 $sec^{-1}$ | 440 $sec^{-1}$ | 1469 $sec^{-1}$ | Melt Fracture Shear Rate, $sec^{-1}$ |
|---|---|---|---|---|---|---|
| 34.6 | 6.1 | 0.8 | 0.3 | 0.2 | 0.1 | 0.88 |

STRESS-STRAIN PROPERTIES

| Room Temperature | | | 70° C. | | |
|---|---|---|---|---|---|
| Tensile Strength | 100% Modulus | Elongation at Break | Tensile Strength | 100% Modulus | Elongation at Break |

TABLE XVIII-continued

| psi | psi | % | psi | psi | % |
|---|---|---|---|---|---|
| 5540 | 470 | 540 | 850 | 240 | 550 |

Since many modifications and variations of this invention may be made without departing from the spirit or scope of the invention thereof, it is not intended to limit the spirit or scope thereof to the specific examples thereof.

What is claimed is:

1. A process for forming a powder of a metal, ammonium or amine neutralized sulfonated polymer, wherein said neutralized sulfonated polymer is derived from an EPDM terpolymer, a Butyl rubber or polystyrene, said powder having a particle size distribution of about 500 to about 3000 microns and a volume density of about 10 lbs/ft$^3$ to about 25 lbs/ft$^3$, which comprises the steps of:
    (a) contacting a quenched cement of a polymer dissolved in a hydrocarbon solvent with a sulfonating agent to form an unneutralized sulfonated polymer;
    (b) adding an amine or neutralizing agent which is a basic salt to said cement, wherein a counterion of said basic salt is selected from the group consisting of ammonium, antimony, iron, lead and Groups IA, IIA, IB and IIB of the Periodic Table of Elements;
    (c) adding water to said cement to gel said cement, wherein the volume ratio of water to cement is about 60:1 to about 2:1;
    (d) suspending said gel to form a slurry of cement particles of said neutralized sulfonated polymer;
    (e) removing said solvent from said slurry;
    (f) separating said particles of said powder from said water; and
    (g) drying said particles of said powder.

2. The process of claim 1, wherein said neutralizing agent is an ammonium or metallic salt of a carboxylic acid.

3. The process of claim 1 wherein said neutralized sulfonated polymer has about 5 to about 250 meq. of sulfonated groups per 100 grams of said neutralized sulfonated polymer.

4. The process of claim 1, wherein said powder has a volume density of about 15 to about 30 pounds/cubic foot.

5. The process of claim 1 wherein said solvent is removed from said slurry by solvent flashing.

6. The process of claims 1 or 5 wherein said particles are removed from slurry by filtration.

7. The process of claim 6 wherein said particles are dried by mechanical dewatering followed by hot air drying.

8. The process of claim 7 further including washing said particles with water prior to said mechanical drying.

9. The process of claims 1 or 7, further including adding a non-polar process oil to said cement prior to adding said water to said cement, said oil being added at a concentration of about 20 to about 200 parts by weight per 100 parts by weight of the neutralized sulfonated polymer.

10. The process of claims 1, 7 or 9 further including adding a preferential plasticizer to said cement prior to adding said water to said cement, said preferential plasticizer added at a concentration of less than about 60 parts by weight per 100 parts by weight of said neutralized sulfonated polymer.

11. The process of claims 1, 7 or 9 further including dry blending a filler, or polyolefinic thermoplastic with said formed powder, wherein said polyolefinic thermoplastic has a molecular weight of at least 2,000.

* * * * *